United States Patent [19]
Mistopoulos, Jr.

[11] 3,961,821
[45] June 8, 1976

[54] VEHICLE BODY HAVING A WINDOW OPENING

[75] Inventor: Chris Mistopoulos, Jr., Detroit, Mich.

[73] Assignee: Ford Motor Company, Dearborn, Mich.

[22] Filed: June 23, 1975

[21] Appl. No.: 589,641

[52] U.S. Cl. .............................. 296/146; 248/208
[51] Int. Cl.² .......................................... B60J 1/10
[58] Field of Search ............ 296/146, 148; 248/208

[56] References Cited
UNITED STATES PATENTS

| | | | |
|---|---|---|---|
| 2,067,939 | 1/1937 | Morrison | 296/146 |
| 2,772,915 | 12/1956 | Renno | 296/146 |
| 3,776,591 | 12/1973 | Krueger | 296/146 |

*Primary Examiner*—M. H. Wood, Jr.
*Assistant Examiner*—John A. Carroll
*Attorney, Agent, or Firm*—John J. Roethel; Keith L. Zerschling

[57] ABSTRACT

A vehicle body having a window opening, a window well subjacent the opening, and a vertical inner body panel forming a wall of the window well. A window panel supported on a bracket is provided for the window opening.

Of importance is the provision for selectively positioning the window panel on the bracket and the bracket on the body panel. This is accomplished by a first series of fasteners for securing the window panel to the face of the bracket and a second series of fasteners for securing the bracket to the body panel. Both series of fasteners pass through a plurality of correlated slots for permitting, prior to final tightening of the fasteners, vertical movement of the window panel relative to the bracket, and fore or aft and inboard or outboard movement of the bracket relative to the body panel.

Interposed between the inner panel and the bracket is an adjustment screw operable to vertically position the window panel is a final position prior to the window panel being fixedly secured to the bracket by tightening of the first series of fasteners.

8 Claims, 3 Drawing Figures

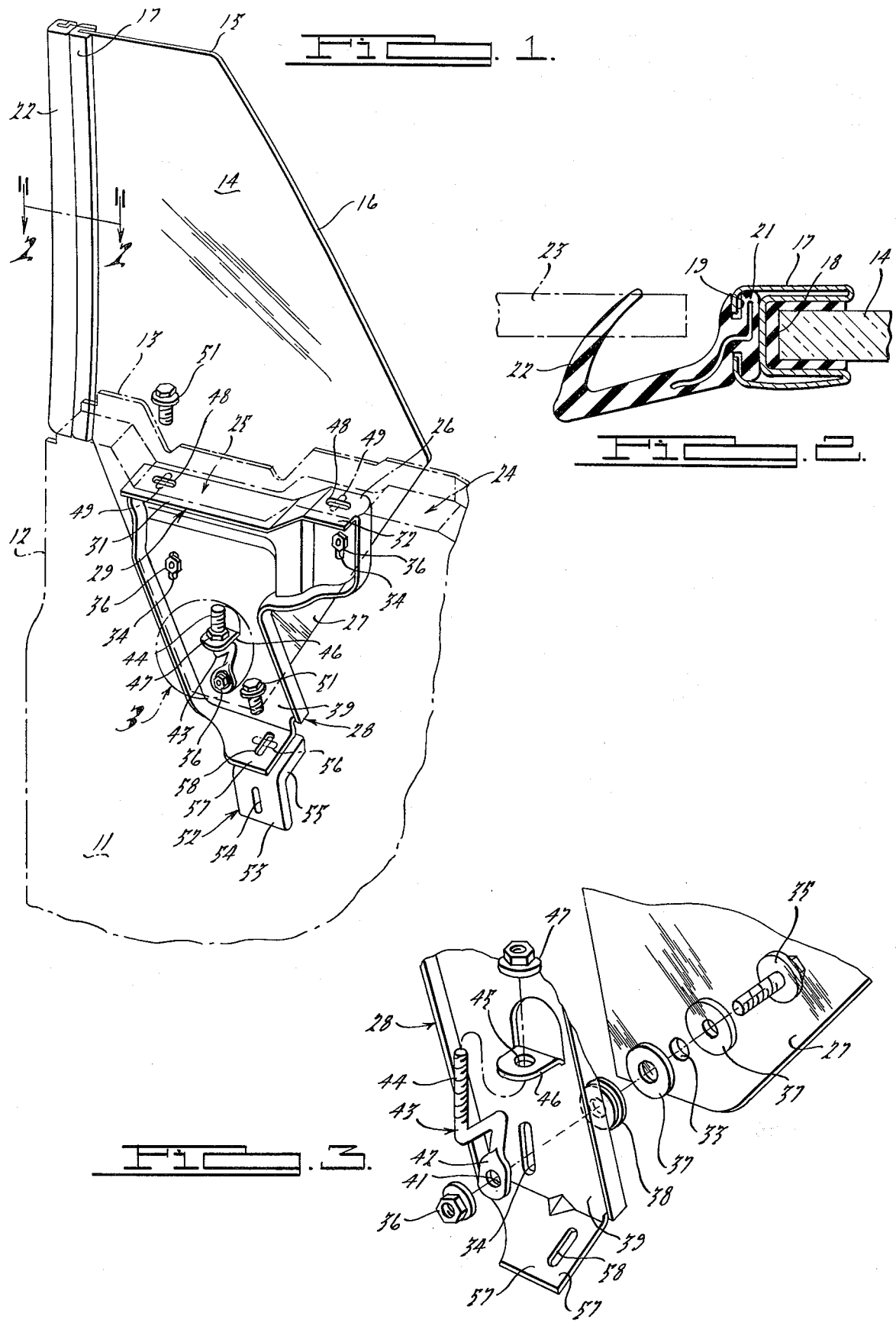

VEHICLE BODY HAVING A WINDOW OPENING

BACKGROUND OF THE INVENTION

In conventional two-door, sedan-type vehicles the window to the rear of the side door window is known as a quarter window. This is a small window that conventionally has been mounted on a window regulator mechanism operable to lower or raise the window into and out of a window well located below the belt line and to the rear of the door pillar. As a practical matter, the quarter window is seldom lowered to an opened condition. On the average, the number of occasions on which passengers are carried in the rear seat are relatively few and the number of occasions on which the passengers desire to lower the window are even fewer. Many vehicles are equipped with air conditioners and the quarter windows are almost never lowered for ventilation purposes.

As a cost saving move, it has been concluded that the quarter window regulator mechanism could be eliminated as standard equipment and that a fixed window could be substituted.

Accordingly, it is an object of the present invention to provide a vehicle body having a fixed quarter window concept that would meet production assembly feasibility in terms of easy installation of the window panel assembly and its component parts. In addition, an important feature is the ease of adjustment of the window panel assembly to maintain a consistent panel position in all body opening build variations within the permissible dimensional tolerances.

SUMMARY OF THE INVENTION

The present invention relates to a vehicle body having a window opening, a window well subjacent the opening in a vertical inner body panel forming a wall of the window well. A window panel supported on a bracket is provided for the window opening.

The improvement comprises a first series of fasteners for securing the window panel to a face of the bracket and a second series of fasteners for securing the bracket to the body panel. Both series of fasteners pass through a series of correlated slots which permit, prior to final tightening of the fasteners, vertical movement of the window panel relative to the bracket, and fore or aft and inboard or outboard movement of the bracket relative to the body panel.

An adjustment screw is interposed between the window panel and the bracket. The adjustment screw is operable to vertically position the window panel in a final position in the window opening prior to the window panel being fixedly secured to the bracket upon the first series of fasteners being tightened.

BRIEF DESCRIPTION OF THE DRAWING

Further features and advantages of the present invention will be made more apparent as this description proceeds, reference being had to the accompanying drawing, wherein:

FIG. 1 is a perspective view of a window panel and bracket assembly embodying the present invention in its relationship to a vehicle body inner panel, the latter being shown in dot-and-dash outline;

FIG. 2 is a section view on the line 2—2 of FIG. 1; and

FIG. 3 is an enlarged exploded view of the portion of FIG. 1 within the circle 3.

DETAILED DESCRIPTION OF THE INVENTION

Referring now to the drawing, there is shown in FIG. 1, in dot-and-dash outline, a portion of a vehicle body, specifically a vertical inner body panel 11 that forms a wall of a window well positioned beneath a vehicle body window opening.

The vehicle body for which the present invention is particularly adapted is the conventional two-door pillarless or hardtop sedan. That is, the door rear jamb or pillar represented by the dotted line 12 terminates at the vehicle belt line represented by the upper edge 13 of the body inner panel 11 and there is no pillar extending to the roof rail. A window panel 14 is adapted to be received in the window opening, the panel 14 being frameless at its upper edge 15 and rear inclined edge 16 but having a frame 17 at its front edge 18, as best seen in FIG. 2. The frame 17 is provided with a retention channel 19 to receive the base 21 of an elastomeric weatherstrip or seal 22 which is adapted to overlie the window 23 of a vehicle front door. This construction is conventional in two-door pillarless or hardtop vehicles.

The vehicle body inner body panel 11 has at its upper edge a flange 24 having horizontally stepped portions 25 and 26, for a purpose to be explained.

The window panel 14 has a substantially triangular depending extension 27 which is adapted to be bolted to a window panel receiving face (not visible) of a bracket, generally designated 28. The bracket 28 is provided at its upper end with a perimetric flange 29 which has stepped portions 31 and 32 complementary to the stepped portions 25 and 26 of the inner body panel 11.

The window panel extension 27 is apertured as at 33 (see FIG. 3) in three locations, the apertures 33 being in alignment with vertical slots 34 in the bracket 28. At the upper fastening suitable bolts 35 and nuts 36 are utilized to fasten the panel extension 27 to the bracket 28. The bolts and nuts are isolated from the glass by elastomeric washers 37. The lower fastening is a little more complicated. In this area, as shown in FIG. 3, the bracket 28 is spaced from the panel by a nut 38 interposed between the panel extension 27 and the lower end 39 of the bracket 28. The bolt 35, which may be longer than the upper two bolts, projects through the slot 34 in the lower bracket portion 39 and through an aperture 41 in the head 42 of a retainer or adjusting screw 43. The retainer or adjusting screw 43 is held on the bracket lower end portion 39 by a nut 36. The retainer or adjusting screw 43 has an offset threaded end portion 44 which projects through an aperture 45 in a flange 46 lanced out of the bracket 28. The upper end of the threaded end portion 44 receives a combination nut-washer 47.

The window panel 14 and bracket 28 are preassembled before installation into the vehicle body. It will be understood that the inner body panel 11 will be provided with an access hole large enough for the window panel and bracket assembly to be inserted into the window well — that is, between the inner panel 14 and the body outer panel (not shown). The assembly is then raised until the complementary flanges 24 and 29 on the inner body panel 11 and bracket 28 are in abutting relationship. The bracket 28 flange portions 25 and 26 have aligned longitudinally extending slots 48 which overlie parallel laterally extending slots 49 in the inner panel 11 flange portions 25 and 26. The slots 48 and 49 are thus at right angles to each other. Bolts 51 inserted through the slots 48–49 engage nuts (not visible) held on the bracket flange 29 by suitable nut retainers (not visible).

The lower end 39 of the bracket 28 is stabilized on the inner body panel by an auxiliary right angle bracket 52, the vertical leg 53 of which has a vertical slot 54 providing for vertical adjustment of the auxiliary bracket on the inner body panel 11. The horizontal leg 55 of the auxiliary bracket has a slot 56 therein extending longitudinally of the inner body panel 11. The lower end 39 of bracket 28 has a flange 57 paralleling the auxiliary bracket leg 55, the flange 57 having a slot 58 adapted to overlied the slot 56 at right angles thereto.

The leg 55 of the auxiliary bracket 52 is the equivalent of a horizontal flange on the inner body panel spaced from the upper horizontal flange 29 and may be considered as such hereinafter.

The installation of the window panel 14 and bracket 28 assembly into a vehicle body may be summarized as follows:

As noted, the window panel 14 is preassembled to the bracket 28 by fasteners 35. The auxiliary bracket 52 may also be loosely secured to the flange 57 on the bracket 28 by a bolt 51 inserted through the overlapping right angled slots 56–58. In this preassembled stage, the fasteners 35 are not tightened in order to permit adjustment movement of the window panel 14 relative to the bracket 28 to the extent permitted by the vertical slots 34 in the bracket 28. After the window panel 14 and bracket 28 assembly is inserted into the window well through the access hole in the inner body panel 11, the bracket flange 29 is loosely secured to the inner body flange 25 by the upper bolts 51 which are inserted through the overlapping slots 48–49. The auxiliary bracket 52 may then be loosely secured to the inner body panel by a bolt that passes through the slot 54 in the vertical leg 53 of the bracket 52.

With the front door glass 23 as a guide to properly align the upper portion of the window panel 14 in the body opening, the window panel is moved fore or aft and inboard or outboard as required. When properly positioned, the upper bolts 51 may be tightened to clamp the bracket flange 29 to the inner panel flange 25.

The window panel 14 may then be tilted at the top as required to align the same with the weatherstrip in the window opening. When this is satisfactorily accomplished, the lower bolt 51 is tightened to secure the lower flange 57 of the bracket 28 to the horizontal leg or flange 55 of the auxiliary bracket 52. The vertical leg 53 of the bracket 52 is then secured by a suitable bolt and nut to the inner body panel.

All that now remains to be done is to properly seat the window panel edges 15 and 16 in the roof rail and rear pillar weatherstrips of the window opening in the vehicle body. This is done by tightening the nut 47 causing the adjustment screw 43 to be lifted thus raising the window panel 14 relative to the bracket 28. This action is continued until a proper glass height and sealing relationship between the window panel 14 and body opening weatherstrip are achieved. This window panel 14 may then be fixedly secured to the bracket 28 by tightening the nuts 36 on the bolts 35 to lock the panel 14 to the bracket 28.

It is to be understood that this invention is not limited to the exact construction illustrated and described above, but that various changes and modifications may be made without departing from the spirit and scope of the invention as defined by the following claims.

I claim:

1. A vehicle body having a window opening, a window well subjacent the opening, and a vertical inner body panel forming a wall of the window well,
    a window panel for the window opening,
    and a bracket supporting the window in the opening, wherein the improvement comprises:
    a first series of fasteners for securing the window panel to a face of the bracket and a second series of fasteners for securing the bracket to the body panel,
    both series of fasteners passing through a plurality of correlated slots for permitting, prior to final tightening of the fasteners, vertical movement of the window panel relative to the bracket and fore or aft and inboard or outboard movement of the bracket relative to the body panel,
    and an adjustment screw interposed between the window panel and the bracket,
    the adjustment screw being operable to vertically position the window panel in a final position in the window opening prior to the window panel being fixedly secured to the bracket by tightening the first series of fasteners.

2. A vehicle body having a window opening according to claim 1, in which:
    the adjustment means comprises a threaded retainer secured to the window panel,
    an apertured flange on the bracket intermediate the ends thereof through which the threaded retainer projects,
    and positioning means on the retainer in engagement with the flange.

3. A vehicle body having a window opening, a window well subjacent the opening and a vertical inner body panel forming a wall of the window well,
    the vertical body panel having vertically spaced substantially horizontal support flanges,
    one of the support flanges being located at the upper end of the body panel,
    a window panel for the window opening, a bracket having a window panel receiving face substantially paralleling the vertical body panel and a first flange at its perimeter,
    first fastening means securing the window panel to the face of the bracket,
    the first fastening means passing through a plurality of slots in the bracket permitting, prior to the tightening of the first fastening means, adjustment of the window panel relative to the bracket,
    second fastening means securing the bracket through its first flange to the one flange of the body panel,
    the second fastening means passing through a plurality of slots in the body panel and bracket first flange permitting, prior to tightening of the second fastening means, fore or aft and inboard or outboard adjustment of the bracket position relative to the window opening,
    and an adjustment screw interposed between the window panel and bracket operable to vertically position the window panel in the window opening prior to the window panel being fixedly secured to the bracket by tightening of the first fastening means after the bracket has been secured to the body panel by tightening of the second fastening means.

4. A vehicle body according to claim 3, in which:
the adjustment means comprises a threaded retainer secured to the window panel,
an apertured flange on the bracket intermediate the ends thereof through which the threaded retainer projects,
and positioning nuts threaded on the retainer in engagement with the flange.

5. A vehicle body according to claim 4, in which:
the plurality of slots through which the second fastening means passes comprises a plurality of pairs of slots at cross angles to each other.

6. A vehicle body according to claim 5, in which:
an auxiliary bracket mounted on the body panel forms a second one of the horizontal flanges thereon,
a second flange of the first-mentioned bracket being coupled to the auxiliary bracket by fastening means passing through a pair of slots at right angles to each other,
the auxiliary brackets stabilizing the first-mentioned bracket on the body panel.

7. A vehicle body according to claim 3, in which:
the plurality of slots through which the fastening means passes comprises a plurality of pairs of slots at right angles to each other.

8. A vehicle body according to claim 3, in which:
an auxiliary bracket mounted on a body panel forms a second one of the horizontal flanges thereon,
a second flange of the first-mentioned bracket being coupled to the auxiliary bracket by fastening means passing through a pair of crossed slots,
the auxiliary bracket stabilizing the first-mentioned bracket on the body panel.

* * * * *